(12) United States Patent
Ozanne

(10) Patent No.: US 9,743,802 B2
(45) Date of Patent: Aug. 29, 2017

(54) PROCESS OF BREWING TEA LEAVES CONTAINED IN A CAPSULE

(75) Inventor: Matthieu Ozanne, Chessel (CH)

(73) Assignee: Nestec S.A., Vevey (CH)

( * ) Notice: Subject to any disclaimer, the term of this patent is extended or adjusted under 35 U.S.C. 154(b) by 1387 days.

(21) Appl. No.: 13/140,518

(22) PCT Filed: Dec. 22, 2009

(86) PCT No.: PCT/EP2009/067729
§ 371 (c)(1),
(2), (4) Date: Jun. 17, 2011

(87) PCT Pub. No.: WO2010/076264
PCT Pub. Date: Jul. 8, 2010

(65) Prior Publication Data
US 2011/0250333 A1 Oct. 13, 2011

(30) Foreign Application Priority Data

Dec. 30, 2008 (EP) ..................................... 08173075

(51) Int. Cl.
*A47J 31/36* (2006.01)
*A47J 31/00* (2006.01)

(52) U.S. Cl.
CPC ........... *A47J 31/369* (2013.01); *A47J 31/002* (2013.01); *A47J 31/3623* (2013.01)

(58) Field of Classification Search
USPC ........................................................ 426/435
See application file for complete search history.

(56) References Cited

U.S. PATENT DOCUMENTS

| 4,581,239 | A | 4/1986 | Woolman et al. |
| 2004/0197444 | A1* | 10/2004 | Halliday et al. ............ 426/112 |
| 2007/0261564 | A1 | 11/2007 | Liverani et al. |
| 2008/0245236 | A1 | 10/2008 | Ternite et al. |

FOREIGN PATENT DOCUMENTS

| EP | 0806168 | 11/1997 |
| EP | 1440640 | 7/2004 |
| EP | 1440913 | 7/2004 |
| EP | 1774878 | 4/2007 |
| EP | 1775234 | 4/2007 |
| EP | 1950150 | 7/2008 |

(Continued)

OTHER PUBLICATIONS

PCT International Search Report for Application No. PCT/EP2009/067729 with a Mailing Date of Mar. 31, 2010, 6 Pages.

(Continued)

*Primary Examiner* — D. Lawrence Tarazano
*Assistant Examiner* — Stephanie Cox
(74) *Attorney, Agent, or Firm* — K&L Gates LLP

(57) ABSTRACT

The invention concerns a process for the preparation of a beverage in a beverage machine with a capsule comprising an enclosure containing tea leaves comprising the steps of: a) introducing water in the capsule to submerge the tea leaves in the capsule enclosure, then b) letting the tea leaves soak, then c) introducing water in the capsule until the required volume of beverage is delivered, wherein water is continuously introduced in the capsule from the beginning of step a) until the end of step b).

14 Claims, 2 Drawing Sheets

(56) References Cited

FOREIGN PATENT DOCUMENTS

| | | |
|---|---|---|
| EP | 1 974 638 | 10/2008 |
| GB | 1573261 | 8/1980 |
| GB | 2447024 | 9/2008 |
| WO | WO0219875 | 3/2002 |
| WO | 0228241 | 4/2002 |
| WO | WO2006055673 | 5/2006 |
| WO | 2007042414 | 4/2007 |

OTHER PUBLICATIONS

PCT Written Opinion of the International Searching Authority for Application No. PCT/EP2009/067729, with a Mailing Date of Mar. 31, 2010, 9 Pages.

* cited by examiner

PROCESS OF BREWING TEA LEAVES CONTAINED IN A CAPSULE

The present invention relates to a process for brewing tea leaves or other kinds of herbal leaves contained in a beverage producing capsule.

Different beverage capsules for brewing beverages in a suitable beverage machine are known. One commercially successful capsule system for extracting beverage from capsules consists in placing an air- and water-impermeable capsule into an extraction device, injecting hot water into the capsule and releasing the liquid extract out of the capsule. Most of the beverages produced by these capsules are coffee or beverages issued from the dissolution of soluble liquid or powder ingredients.

Concerning the production of tea beverage, WO 2007/042414 describes capsules more particularly suited for tea beverages produced from a capsule containing leaf tea product and the like. Quality of a tea beverage is highly dependent on the quality of the leaf tea ingredients, i.e., the tea origin used (soil, drying, blending, etc.) and their storage conditions. For instance, tea ingredients are usually sensitive to oxygen and light. Preferred tea ingredients are taken from loose leaves, chiselled or broken in small fragments. However, brewing conditions are also important to take full advantage of the quality of the ingredients used.

Usually beverage machines process all the capsules the same way because they process always the same product, coffee for example. Other machines have also been developed for producing different kinds of beverages: they are able to produce either coffee or chocolate or tea or cappuccino. For example EP 1 440 640 describes such a type of machine. This machine enables the production of different beverages (coffee, chocolate, milk, . . . ). It mentions that the cycle of production comprise four steps: pre-wet, pause, brew/mixing and purge. The pause allows the beverage ingredient to soak in the water injected during the pre-wet stage for a period of time.

Contrary to roast and ground coffees of different origins that are all extracted according to the same process, there exists a large variety of different tea leaves: black, green, white, red, herbal teas perfumed with a lot of different aromas and each of these leaves can require specific extraction. In particular it has been noticed that the brewing of tea leaves is dependent from the temperature of the water used for the extraction and that it is important to control this parameter during the extraction of tea leaves. It is known to control the temperature of the water before it is introduced in the capsule. Generally this control is made by the control of the water heating means. Yet there is no more control of the fluid temperature once the water has been introduced in the capsule. Due to the pause step that is usually implemented in the brewing cycle, it has been observed that the fluid temperature can drop during the extraction which leads to a non optimal brewing.

The present invention aims at solving the problem of quality by improving the brewing process of tea leaves in a process of preparation of tea beverage from a capsule containing tea leaves.

The present invention aims also at solving the problem of brewing tea leaves in a process of preparation of tea beverage from a capsule containing tea leaves by maintaining the optimal temperature of brewing during all the extraction process.

According to a first aspect, the invention concerns a process for the preparation of a beverage in a beverage machine with a capsule comprising an enclosure containing tea leaves comprising the steps of:
a) introducing hot water delivered from pumping and heating means in the capsule to submerge the tea leaves in the capsule enclosure, then
b) letting the tea leaves soak, then
c) introducing hot water in the capsule until the required volume of beverage is delivered,
wherein water is continuously delivered from the pumping and heating means during the three steps and:
   either continuously introduced in the capsule from the beginning of step a) until the end of step c), or
   at least partially sent to waste during step b).

The process of the present invention is adapted for the preparation of a tea beverage by introduction of hot water in a capsule containing tea leaves, the capsule presenting an inlet for introducing water and an outlet for evacuating the extracted tea beverage. The inlet and/or the outlet can be preformed or produced by puncturing means of the machine. The hot water is delivered from pumping and heating means. These means are usually connected together so that the pumping means delivers cold water to the heating means and the heating means delivers hot water to the capsule. The pumping means can be a solenoid pump. The heating means can consist in a resistive element placed in a chamber—generally a tube—connected to a water inlet and a water outlet. The heating means can also comprise at least one temperature sensor to control the temperature of the delivered hot water.

According to the invention, in the first step a), water is introduced in the capsule to at least submerge all the tea leaves in the capsule enclosure. During this step a), the tea leaves are wetted. Preferably, during step a), water is introduced at a flow of at least 150 ml/min. Such a flow value enables the rapid filling of the capsule to manage optimal beverage preparation time length. The value of this flow can also depend from the type of heating means used to heat the water and its ability to provide hot water at high flow rates.

Immediately after step a) and the wetting of the leaves, step b) starts during which the tea leaves soak. During this step, tea leaves rest so that they can unfold. According to the state of the art, during step b), the introduction of water is stopped. But according to the invention, it has been noticed that water must be continuously pumped and heated to maintain the temperature of the hot water inside the capsule during the brewing.

According to the preferred mode of the present invention, water is continuously introduced in the capsule from the beginning of step a) until the end of step c). Then according to the invention the water feeding is never stopped along all the brewing cycle that comprises the three steps a), b) and c). In this mode the fact of not stopping the water feeding flow enables to compensate the absorption of the water heat by the capsule structure to the detriment of the tea leaves. With this preferred mode, the fact of continuously introducing hot water in the capsule maintains the temperature of the brewing water inside the capsule.

According to a less preferred mode, water is at least partially sent to waste during step b). The fact of continuously delivering hot water from the heating and pumping means—even if hot water is not introduced in the capsule—avoids a too important change of the temperature of the water delivered from the pumping and heating means when water is introduced again in the capsule after the hot water has been partially sent to waste during step b).

Then according to the invention the flow of water delivered by the pumping and heating means during the soaking step b) is never null. During step b) the water is produced at a soaking flow of at least 20 ml/min, generally comprised between 20 and 80 ml/min, preferably of at most 50 ml/min. It has been observed that maintaining a water flow of at least 20 ml/min is sufficient to compensate the absorption of the heat by the capsule elements and to maintain the temperature of the delivered hot water during the soaking step at the targeted value.

According to an embodiment, the quantity of water introduced during step a) is inferior to the internal volume of the capsule. Then according to the preferred mode the introduction of water during step b) can complete the filling of the tea leaves enclosure. Depending on the internal volume of the capsule, the water introduced during step b) can overflow the capacity of the capsule internal volume; in this last case, a drip flow is produced in the container or cup placed at the outlet of the capsule.

During this step b), the extraction of tea begins. Generally the time length of step b) is at least 5 seconds, preferably at most 50 seconds. According to a specific embodiment of the invention, during step b) water can be briefly introduced during at least one period (b') in the capsule at a stirring flow superior to the soaking flow to stir tea leaves. During this soaking step b) that corresponds to a quiet period during which tea leaves are at rest on account of no introduction of water or introduction of water at low flow, the short introduction of water at a stirring flow superior to the soaking flow creates a turbulent jet of water able to move and stir the tea leaves and to redistribute the leaves in the capsule before they are again left at rest. Due to this stirring and redistribution of the tea leaves, extraction of tea leaves can be boosted because immobilization of tea leaves after step a) creates places where tea extract concentration is high and then inhibition of further extraction in the area near from these places. In order to provide a jet of water sufficient to stir tea leaves, the stirring flow is preferably at least greater than 150 ml/min. Several stirring jets of water can occur separated by rest periods during which the water flow rate stays inferior to 80 ml/min. In step b), the number of periods during which water is introduced in the capsule to stir tea leaves, the time length of this/these period(s) and the total time length of step b) can be adjusted in function of at least:

the nature of brewed tea leaves, in particular their size, their dryness, their flavour, and the desired strength of the final beverage. Preferably in step b) of the process of the present invention, water is introduced in the capsule to stir tea leaves one or two times (corresponding to two stirring periods (b')). Generally, the time length of each period during which water is introduced in the capsule to stir tea leaves is inferior to 5 seconds. The time length between two periods during which tea leaves are stirred preferably lasts during 5 and 15 seconds.

Lastly during step c), the rest of the water necessary to provide the desired volume of beverage is introduced in the capsule. Preferably during step c) water is introduced at a flow of at least 150 ml/min in order to match the shortest beverage delivery time.

The different flow rates of water according to the different steps of the process can be set so that the total time for implementing steps a) to c) is comprised between 40 seconds and 2 min.

Generally water is introduced in the capsule with a temperature comprised between 30 and 95° C.

According to the preferred embodiment of the present invention, the process is implemented with a capsule comprising:

an enclosure containing tea leaves, a filtering wall delimiting at least one filtering side of the enclosure, an overflow wall that is positioned in the path of the brewed liquid after the filtering wall and which comprises at least one overflow aperture or is associated with at least one puncture means or, respectively, puncture indication means capable of producing or, respectively, indicating at least one overflow aperture. Preferably the filtering wall extends from below a median horizontal plane passing through the enclosure when the capsule is oriented so that at least one overflow aperture or puncture means or, respectively the puncture indicating means, is placed above said plane. Such a capsule is more specifically described in WO 2007/042414.

According to a second aspect, the invention concerns a beverage production system comprising:

beverage ingredient containing capsules comprising an identification member, and a beverage production machine for receiving said capsules, said machine comprising reading means for reading the capsule identification member in order to read information thereof and control means connected to the reading means and designed to control the operation of the beverage production machine in response to the read information, characterized in that the identification member provides instructions to the machine for brewing tea leaves according to the process such as described above.

This identification member can be of any nature like bar code, colour code (identified by a visual sensor), RFID tag (identified by a RF sensor), indents, cut outs, protrusions, holes (identified by a mechanical sensor), magnetic code, electronic code, induction code, conduction code . . . Preferably, the identification member is designed for being physically contacted from outside and is covered by a deformable, displaceable, removeable and/or puncturable cover. Capsules presenting this kind of identification member are described in EP 1 950 150. Generally, the machine-readable information are selected in the list of: the temperature of the water, the values of the water flows of steps a), b) and/or c), the number of stirring periods in step b), the time length of the steps a), b) and/or c) and combinations thereof. The beverage machine in which is used said capsule comprises control means designed to control: the values of the water flows of steps a), b) and c), the number of stirring periods in step b), the time length of the different steps in response to the read information. Based on the information provided by the identification member, the control unit can then vary the brewing parameters especially the water flow of steps a), b) and c), the number of stirring periods in step b), the time length of the different steps flow rate for the brewing of different tea beverages according to capsules containing leaf tea ingredients having different characteristics and/or origins.

In the present application, the terms "capsule" means also "cartridge" or "package". The term "capsule" will be preferentially used. The words "brewing" or "infusion" are used as synonymous. The term "brewing fluid" generally refers to the liquid that serves to infuse the beverage ingredients, more generally, hot water.

In the present application, the term "tea" encompasses all type of leaf tea such as green tea, black tea, white tea, chai tea, flavoured tea and herbal or fruit tea. The term "leaf tea/tea leaves" or "leaf ingredient" refers to brewable tea or other ingredients in whatever form such as complete, cut or chiselled leaves, small fragments of leaves, powder or dust.

BRIEF DESCRIPTION OF THE DRAWINGS

The characteristics and advantages of the invention will be better understood in relation to the figures which follow.

DETAILED DESCRIPTION OF THE DRAWINGS

Figure 1:
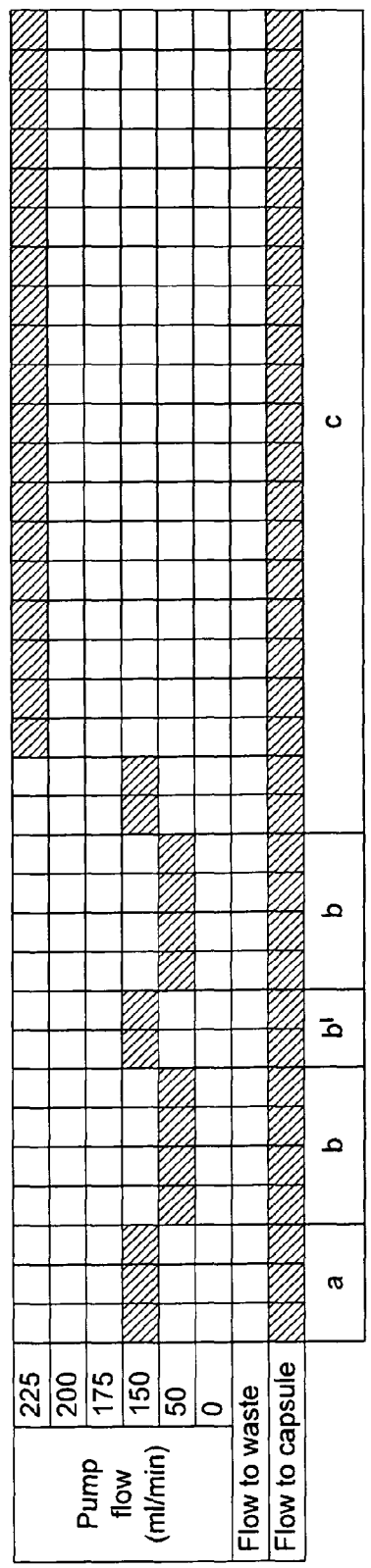
FIG. 1 is a diagram presenting the hot water flow introduced in the capsule according to each step of the brewing process according to the preferred mode of the invention.

FIG. 1 illustrates the values of the hot water flows introduced in a capsule for each step of the process and the time length of introduction of these different flows according to the invention.

As illustrated in FIG. 1, in step a), the capsule is filled with hot water with a flow of water of 150 ml/min. The volume of water that is introduced in the capsule corresponds to the capsule teal leaves enclosure volume.

In step b):
the capsule is first filled with hot water again but at a lowest flow of 50 ml/min so as to not stir the tea leaves and let the leaves unfold,
then capsule is filled with hot water at a greater flow of 150 ml/min (step b') during a short time of 3 seconds to stir the leaves in order to redistribute them,
then capsule is finally filled with hot water again but at the lowest flow of 50 ml/min so as to not stir the tea leaves an let the redistributed leaves unfold.

During step b), when the volume of injected water overlaps the capsule tea leaves enclosure volume, water gently drips through the capsule outlet inside a final cup or container.

In step c), the capsule is filled with hot water firstly at a flow of 150 ml/min and then rapidly at a flow of 225 ml/min until the total desired volume of tea beverage flows through the capsule outlet and fills the cup.

The process of preparation and dispensing of the tea beverage ready to be drunk lasts 51 seconds.

Figure 2:
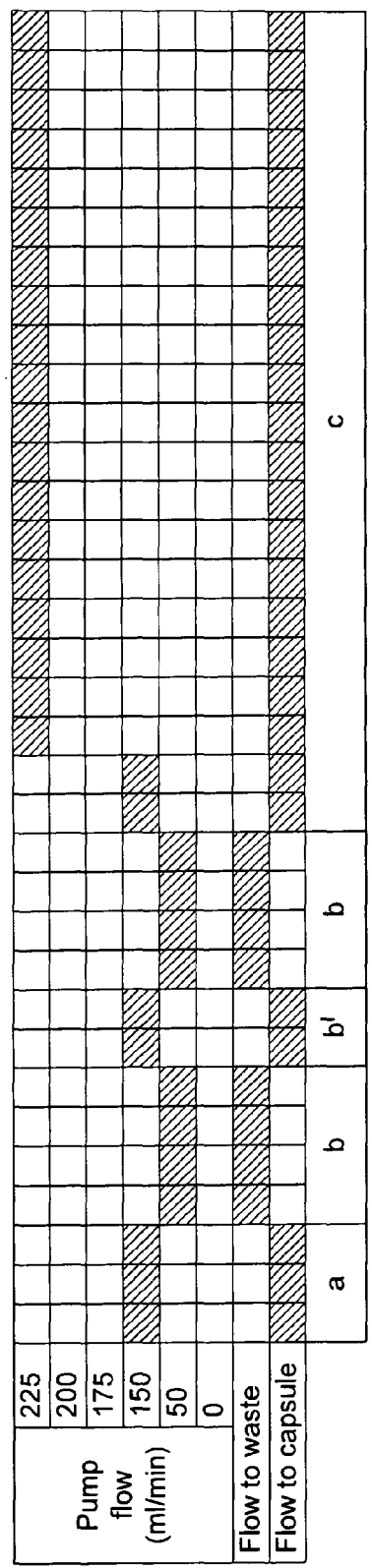
FIG. 2 is a diagram presenting the hot water flow introduced in the capsule according to each step of the brewing process according to the less preferred of the invention.

FIG. 2 illustrates the values of the hot water flows introduced in the capsule for each step of the process and the time length of introduction of these different flows according to a second embodiment of the invention.

In step a), the capsule is filled with hot water with a flow of water of 150 ml/min. The volume of water that is introduced in the capsule corresponds to the capsule volume.

In step b):
no hot water is introduced in the capsule so that the tea leaves can stay at rest and unfold. Yet, the pump is not stopped during this short period to avoid the stagnation of water in the pump and the development of scale; hot water flow is just derived from capsule inlet and sent to waste.
then capsule is filled with hot water at a flow of 150 ml/min (step b') during 3 seconds to stir the leaves and redistribute them,
then the flow of hot water is derivated to waste so that no flow enters the capsule and that the redistributed leaves can stay at rest and unfold.

In step c), the capsule is filled with hot water firstly at a flow of 150 ml/min and then rapidly at a flow of 225 ml/min until the total desired volume of tea beverage flows through the capsule and fills the cup.

The process of preparation and dispensing of the tea beverage ready to be drunk lasts only 51 sec.

Figure 3:
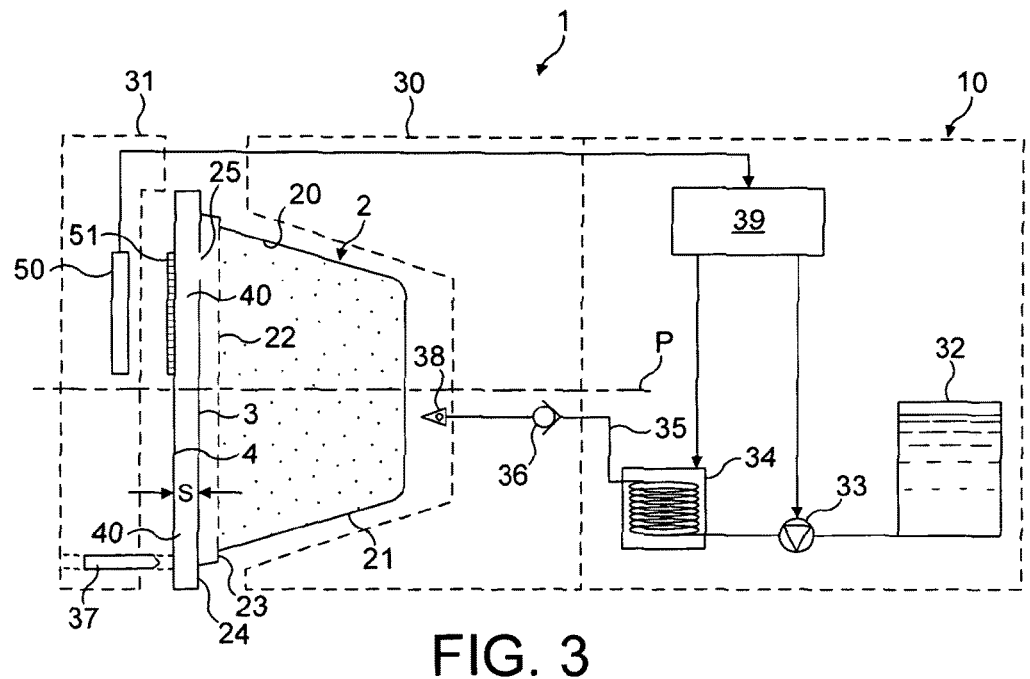
FIG. 3 is a schematic illustration of a capsule brewing system before brewing.
Figure 4:
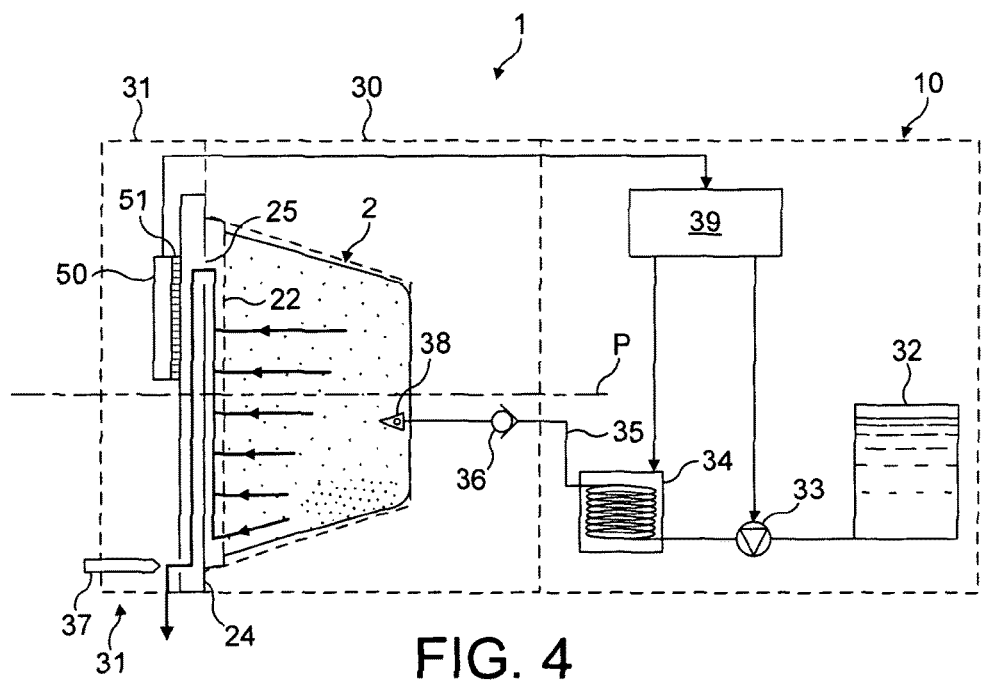
FIG. 4 is a schematic illustration of the capsule brewing system of FIG. 3 during brewing of the capsule.

FIGS. 3 and 4 illustrate a capsule system of which construction is particularly adapted for the implementation of the process of the present invention.

A capsule system 1 is provided that comprises a capsule 2 and a beverage brewing device 10. For simplicity, the beverage brewing device is only schematically depicted and may, in reality, comprise additional technical features within the normal knowledge of the person skilled in the art. The capsule comprises an enclosure 20 containing beverage ingredients such as leaf tea and the like. The enclosure is demarcated by a cup-shaped housing 21 and a filtering wall 22 that is fixedly attached to peripheral inner step 23 of the housing 21. The enclosure is preferably impermeable to gas and light. The housing may encompass different cross sections such as a circular, ellipsoid, square, rectangular or polygonal section that determine as a matter of fact the general profile of the filtering wall 22. The enclosure is sized to accommodate a dose of leaf beverage ingredient of typically about between 1 to 10 grams, preferably 2 to 5 grams. The dose of leaf ingredient may depend on the final volume of beverage to produce. For an individual cup of tea, a typical dose can be of about 2 grams whereas for a tea pot, a typical dose can be of about 8 to 10 grams. As clearly apparent in FIG. 3, the capsule is positioned relative to the brewing device so that the filtering wall 22 extends substantially vertical and from substantially the bottom of the enclosure. For this, the capsule is preferably positioned in a "vertical" arrangement in the brewing device 1. The cup-shaped housing 21 can be so oriented with its large opening and its bottom oriented in a vertical position.

Importantly, the capsule comprises an overflow wall 3 with an overflow aperture 25 placed at least above the median horizontal plane P of the enclosure. The filtering wall 22 and the overflow wall 3 are spaced apart a short distance sufficient to create an interstitial space "s" that is supposed, without being bound by theory, to work as a sort of "siphon" that can promote the upward motion of the denser beverage portion that is predominantly localized in the bottom of the enclosure.

Both the sealing wall and the housing can be made of oxygen barrier materials and the enclosure can be substantially free of oxygen so that the freshness of the beverage ingredients can be preserved during an extended period of time. The sealing wall can be a flexible membrane or a semi-rigid plastic part. A puncturable sealing membrane is preferred such as a monolayer or a multi-layer membrane, typically, laminates of PET/Aluminium/PP, PE/EVOH/PP, PET/Metallised/PP, aluminum/PP. The enclosure is preferably oxygen free and may contain flushed inert gas such as $N_2$, $N_2O$ or $CO_2$.

The capsule can further comprise a cover 4 that is also attached to the rim 24 of the housing 21 and overlaps the sealing wall 3. The cover forms an internal channel 40. An identification member 51 can be present on the cover (or even under the cover). This identification member contains information about the brewing parameters to be implemented to get the better brewing for the tea leaves present inside the capsule.

The shape of the housing of the capsule is not very critical. Preference is given to a truncomical, ellipsoidal or hemispherical shapes for different reasons. This allows a larger surface for the exit of the beverage through the sealing wall when perforated and a reduction of the inside pressure. The housing can also be manufactured industrially at lower cost by plastic thermoforming or aluminium deep drawing. This shape with smoother corners also favours the removal of the handling members and so ejection of the capsule.

Turning to the brewing device 10, it comprises capsule handling members 30, 31 that are configured to hold the capsule in the "vertical" arrangement as defined. These handling members 30, 31 can be machine jaws or any suitable mechanical enclosing means that can open and close about the capsule and can maintain it firmly in place. There is no need for providing high closing forces since the involved fluid pressure in the capsule remains relatively low and, preferably, as close as possible to the atmospheric pressure. Also, since the capsule can withstand the low brewing pressure therefore the capsule does not necessarily need to be entirely enclosed but simply held water tightly in place during brewing. This participates to a simplification of the machine and it reduces machine costs.

The brewing device comprises a water supply 32, such as a water tank, a water pump 33, a heater 34 and a hot water injection line 35 that is managed through the handling member 30. The brewing device may also comprise a controller 39 and a user interface board (not shown) to manage the beverage preparation cycles as known in the art. A backpressure valve 36 can be provided to lower the pressure at the entry side of injection member 38 such as a needle(s) or blade(s) creating a water inlet in the capsule. Of course, the backpressure valve could be omitted and a low pressure pump could be used that delivers fluid at low pressure. Medium to high pressure pump may however be preferred because of their robustness and reliability and so used in combination with a backpressure valve.

The brewing device may further comprise a means 37 for perforating the cover 4 and creating a beverage outlet. As shown in FIG. 3, the perforating means 37 can be activated after closing of the handling members 30, 31 about the capsule. The perforating means is forced or guided through the cover 4. The perforator can be driven by a solenoid or any other equivalent drive means or even manually.

The brewing device may further comprise a detection unit 50 to convert the information of the identification member 51 of the capsule into brewing instructions through the controller 39. In the present the invention, the information especially varies according to the tea leaves present inside the capsule. The information provide to the control unit 39 instructions so that the steps a), b) and c) of the process of the present invention is implemented with specific features adapted for each type of tea leaves that are: the values of water flow of steps a), b) and c), the number of stirring periods in step b), the time length of the different steps.

Preferably the information can be read from the capsule 1 in a non-optical manner, as the optical reading e.g. using a bar code has the disadvantages of having a negative impact on the aesthetic impression of the outer appearance of the capsule and of being prone to failure due to the legibility of the bar code in the environment of the beverage production process. Preferably the information is coded in a digital manner. The information can be coded by a modulation of the surface structure of a face of the capsule 1. E.g. a hole or a recession can represent one logical sate (e.g. "0"), while another surface state ("no recession" or "no hole") can represent the other logical state (e.g. "1"). Replacing the bar code by a surface modulation which can then be detected in a non-optical manner (or even in an optical manner) enhances the reliability of the information reading from the capsule.

In relation to FIG. 4, the method of the invention works as follows. A capsule is inserted in the brewing device and the capsule handling members 30, 31 are closed about the capsule to position it with the sealing wall being substantially vertically oriented. An outlet aperture is created by the perforating means 37 that punctures the cover 4 and is withdrawn to leave the aperture opened. On the opposite side of the capsule, the fluid injection member 38 is introduced in the capsule's enclosure. Hot water is thus injected in the capsule at relatively low pressure, preferably, at a pressure not exceeding 0.2 bar. Hot water slowly fills the capsule in and submerges the beverage ingredients in the enclosure. The brewed beverage is filtered through the filtering wall 22. A denser portion 5 of the beverage may tend to settle in the bottom of the enclosure; which portion is also filtered through the filtering wall since it is properly placed adjacent this portion. The denser beverage is evacuated through the interstitial space "s" as caused by the variation of pressure between the lower part of the space and the upper part of said space therefore acting similarly to a "siphon". The rest of the beverage is also filtered also by passing through the filtering wall at different vertical levels up to the upper level of the fluid in the enclosure and is evacuated to the overflow aperture 25.

It should be noted that the overflow aperture should preferably be placed above the ¾ of the total height of the enclosure and even preferably be placed above the ⅘ of the total height of the enclosure; thus ensuring a more complete submergence of the beverage ingredients and a slower evacuation of the beverage from the enclosure which favours a better infusion process.

The "total height" of the enclosure is meant to be the total distance separating the lowermost point of the enclosure to the uppermost point of the enclosure when the capsule is positioned in the beverage machine ready for the brewing operation. In a possible mode, the filtering wall can be substantially equal to the total height of the enclosure.

The principle of the brewing method according to FIGS. 3 and 4 encompasses different variants and equivalences.

For instance, the overflow wall 3 may not be perforated but may be pre-opened by a pre-cut overflow aperture. The pre-cut overflow aperture means an aperture which has already been made at the manufacturing stage of the capsule. Freshness of the beverage ingredients may so be preserved by different means such as by an airtight closed cover with a sealed outlet that is unsealed just before brewing or by the use of an airtight overwrap package that encloses the capsule.

The capsule may also be conceived without the cover 4 and its channelling function. In which case, the front handling member 31 may be designed to collect the brewed liquid as it passes the overflow wall 3 and travels down to the recipient.

The invention claimed is:

1. A process for the preparation of a beverage in a beverage machine using a capsule comprising tea leaves, the process comprising:
   a) introducing hot water delivered from a pumping and heating member in the capsule to submerge the tea leaves in the capsule enclosure;
   b) letting the tea leaves soak;
   c) introducing hot water into the capsule until the required volume of beverage is delivered; and continuously delivering water from the pumping and heating members during the three steps and continuously introduced in the capsule from the beginning of step a) until the end of step c)

wherein the capsule comprises a filtering wall defining at least one filtering side of the enclosure, and an overflow wall that is located in the path of the brewed liquid after a filtering wall and comprises at least one overflow aperture, wherein the filtering wall extends from below a median horizontal plane passing through the enclosure when the capsule is positioned so that the overflow aperture is located above the plane.

2. The process of claim 1, wherein during step b) the hot water is delivered from the pumping and heating member at a soaking flow of at least 20 ml/min.

3. The process of claim 2, wherein during step b) the water is delivered from the pumping and heating member at a soaking flow between 20 and 80 ml/min.

4. The process of claim 1, wherein the quantity of water introduced during step a) is less than the internal volume of the capsule.

5. The process of claim 1, wherein water is introduced at a temperature of between 30 and 95° C.

6. The process of claim 1, wherein step b) is performed for a time period that is 5 seconds to 50 seconds.

7. A process for the preparation of a beverage in a beverage machine using a capsule comprising tea leaves, the process comprising:

a) introducing hot water delivered from a pumping and heating member in the capsule to submerge the tea leaves in the capsule enclosure;

b) letting the tea leaves soak;

c) introducing hot water into the capsule until the required volume of beverage is delivered; and continuously delivering water from the pumping and heating member during the three steps and at least partially sent to waste during step b).

8. The process according to claim 7, wherein during step b) the hot water is delivered from the pumping and heating member at a soaking flow of at least 20 ml/min.

9. The process according to claim 8, wherein during step b) the water is delivered from the pumping and heating member at a soaking flow between 20 and 80 ml/min.

10. The process of claim 7, wherein the quantity of water introduced during step a) is less than the internal volume of the capsule.

11. The process of claim 7, wherein water is introduced at a temperature of between 30 and 95° C.

12. The process of claim 7 using a capsule comprising:
an enclosure containing tea leaves,
a filtering wall defining at least one filtering side of the enclosure, and
an overflow wall that is located in a path of the brewed liquid after a filtering wall and comprises at least one overflow aperture.

13. The process of claim 12, wherein the filtering wall extends from below a median horizontal plane passing through the enclosure when the capsule is positioned so that the overflow aperture is located above the plane.

14. The process of claim 7, wherein step b) is performed for a time period that is 5 seconds to 50 seconds.

* * * * *